Figure 1:
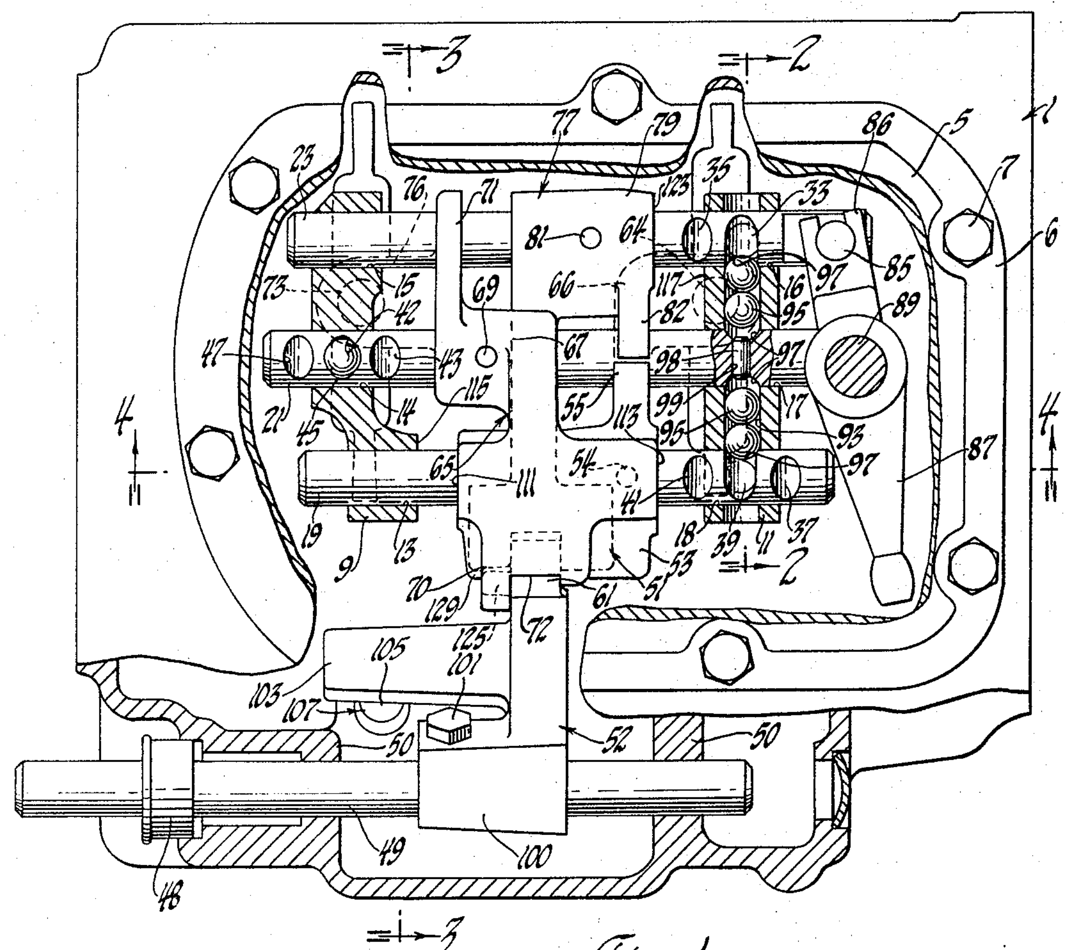

May 14, 1968 W. E. ORAM ET AL 3,382,732

CONTROL MECHANISM

Filed Feb. 5, 1965 2 Sheets-Sheet 1

INVENTORS
William E. Oram, &
Edward L. Francis

A. M. Heiter
ATTORNEY

INVENTORS
William E. Oram, &
Edward L. Francis

A. M. Heiter
ATTORNEY

United States Patent Office 3,382,732

Patented May 14, 1968

3,382,732

CONTROL MECHANISM

William E. Oram, Warren, and Edward L. Francis, Birmingham, Mich., assignors to General Motors Corporation, Detroit, Mich., a corporation of Delaware Filed Feb. 3, 1965, Ser. No. 430,010
6 Claims. (Cl. 74—473)

This invention relates generally to control mechanisms and more particularly to controls for multiple-ratio transmissions.

It has been a frequent practice in controlling manually-operated, multiple-ratio transmissions to provide a plurality of longitudinally-movable shifter rails having shifter heads and forks fastened thereto for conditioning the transmissions for neutral, forward and reverse drives. These shifter rails and their supported shifter heads and forks are generally secured to internally-spaced supports mounted to and within the transmission case. Installation is made through an access opening in the case which is subsequently closed by securing a cover plate thereto. The space limitations imposed by the case and access opening dimensions and the fact that some control parts must be installed before the gearing is fully installed have made the assembly of the shifter rails and their associated parts in the transmission case a most tedious and laborious task. This hampers assembly of the controls in the transmission in mass production and repair procedures.

This invention includes a new and improved cover for transmission cases which structurally supports the reciprocally-movable shifter rails and their associated rail-operator elements necessary for transmission operation. The shifter rails and their associated elements may be conveniently preassembled on the transmission cover; subsequently the cover can be connected to the transmission case with the cover mounted controls in operative engagement with the transmission in assembly-line production. This increases the efficiency of assembly operations and reduces assembly costs. Repair is also simplified since the controls can be quickly removed with the cover and repaired at a more convenient location. This invention makes further standardization of transmission cases possible, since different control and cover assemblies and different gear assemblies can be used with the same transmission case. This invention also includes self-aligning forks attached to the shifter rails which will prevent possible binding and uneven wear of the forks and synchronizer or gear collars when the shifter rails are actuated for gear change.

An object of the invention is to provide a new and improved control mechanism.

Another object of this invention is to provide a new and improved transmission control in which the shift control member is mounted in the transmission case and the transmission shifter rails operated by the shift control member are movably mounted in the transmission case cover.

Another object of this invention is ot provide a new and improved transmission case cover supporting transmission controls which permits high efficiency in assembly of the transmission and which further facilitates repair or replacement, if required.

Another object of this invention is to provide a transmission control cover having shifter rails, shifter heads and forks supported thereon providing a complete control assembly which may be placed on and removed from the transmission case and multi-speed transmission gear unit.

A further object of this invention is to provide a transmission control having: a rotatable transmission shift rod longitudinally-movable in a transmission case, stop means for positively limiting the motions of the shift rod, and a plurality of longitudinally-movable shifter rails mounted on a transmission case cover operable by the shift rod.

Another object of this invention is to provide a transmission control including a removable cover member for tightly closing an access opening of a multi-speed transmission housing, shifter rails movably mounted on the interior of the cover member, shifter heads fixed to the rails, control forks pivoted to certain shifter heads for connecting certain shifter rails to certain transmission gearing, a lever member pivoted to the interior of the cover member connected to certain other transmission gearing, means on one of the rails for pivoting the lever member, and a shift control member mounted in the housing which can be selectively engaged with any of the shifter heads. The elements supported by the cover define a combined profile to fit within the limits of the access opening facility assembly of the controls and the transmission.

Figure 2:
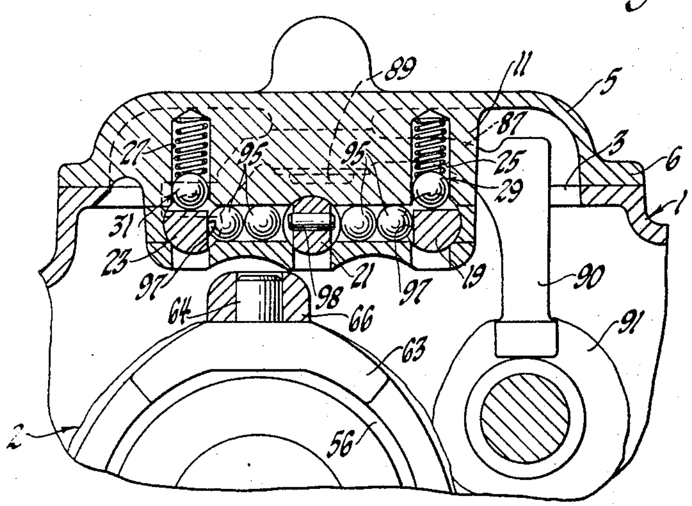
Figure 3:
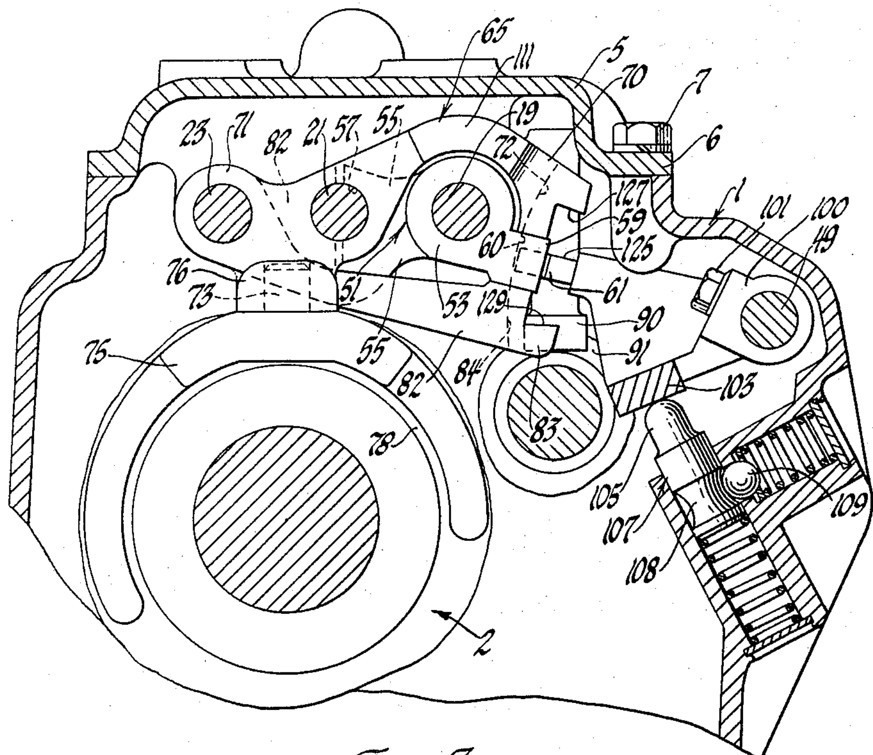
Figure 4:
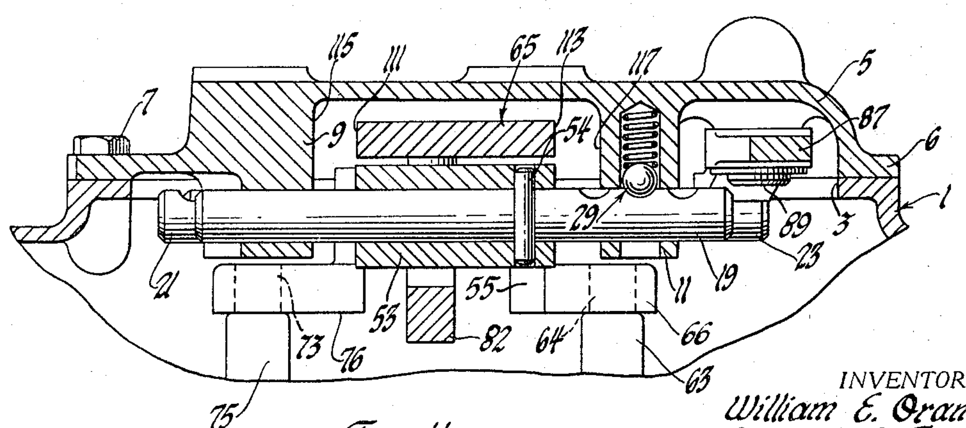

Other objects and advantages of this invention will appear from the following description of a preferred embodiment of this invention shown by the drawings, in which:

FIGURE 1 is a side view of a transmission case with parts broken away showing transmission controls, FIGURE 2 is a view taken generally along the line 2—2 of FIGURE 1, FIGURE 3 is a view taken generally along the line 3—3 of FIGURE 1, and FIGURE 4 is a view along line 4—4 of FIGURE 1.

The case 1 houses a suitable multi-speed transmission 2 which may be a three forward speed and reverse transmission such as in U.S. Patent 3,064,493 to Popovich et al. or, as indicated below, a four forward speed and reverse transmission. As shown, case 1 has an access opening 3 which can be closed by a cover 5. This cover has an outwardly extending peripheral flange 6 with suitable openings for bolts 7 which are used to fasten the cover to the case. Formed integrally on the inside of the cover are front and rear inwardly-projecting laterally-spaced pedestals or supports 9 and 11. These supports have circular apertures 13–18 therein which are aligned for the reception of three cylindrical, elongated shifter rails: first-second rail 19, third-fourth rail 21, and reverse rail 23. These rails are slidably mounted in and project through aligned apertures in the supports, as shown in FIG. 1. The rear support 11 is formed with two bores 25 and 27 therein into which detents 29 and 31 of the spring-ball type are installed. As illustrated by FIGS. 1 and 2, the ball detent 31 is adapted to enter notch 33 or 35 formed in the reverse rail 23 to hold that rail in a neutral or reverse adjusted position. Similarly, the ball detent 29 is adapted to enter one of three notches 37, 39 or 41, formed in the first-second rail 19 to hold this rail in neutral, first or second forward drive position. The front support has a central bore, not shown, which houses a detent 42 for engaging notch 43, 45 or 47, to hold third-fourth rail 21 in a neutral, third or fourth forward drive position.

Each shifter rail has a shifter head which is operated by a single shift control rod 49 to selectively position the shifter rails to adjusted positions. The control rod is mounted for both rotatable and longitudinal reciprocal movement in one side of the case 1 by spaced support structure 50 and through a seal 48 pressed into the case as shown in FIG. 1. This rod has an arm 52 extending at right angles which has an extension or finger 61 for a purpose which will appear below. The first-second shifter head 51 includes a collar portion 53 which is fixed to rail 19 by pin 54, an integral extending retainer portion 55 having a semi-circular cutout 57, which fits rail 21 to prevent rotation of rail 19, and end portion 59 which has a slot 60 capable of receiving the end of the shifter finger 61. As best shown in FIGURE 2, a shift fork 63 is rotatably secured by pivot 64 in a bore in lower support portion 66 of shifter head 51. Pivot 64 fits closely in its bore so that the fork is held by the head for assembly and disassembly purposes, as will appear below. On assembly, this fork extends into an annular groove or collar 56 of a first and second drive synchronizer unit for conditioning the transmission 2 for first and second forward drives.

A third-fourth shifter head 65 includes a collar portion 67 secured to the rail 21 by pin 69. This shifter head has an integral extension 71 which surrounds the rail 23 to prevent rotation of rail 21 and includes an end portion 70 having slot 72 which is capable of receiving the end of shift finger 61 as shown in FIGURE 1. Shift fork 75 has a pivot 73 which fits closely in a cooperating bore in support portion 76 integral with shifter head 65. Thus the fork is also retained by the head for assembly and disassembly with the transmission. As shown, shift fork 75 is adapted to engage an annular groove 78 provided in a second synchronizing unit of transmission 2 for the third and fourth forward drives.

The third shifter head 77 is somewhat similar in construction to the other shifter heads and includes a collar portion 79 secured to the reverse rail by pin 81. This shifter head also includes an extension 82 having a circular cutout for receiving rail 21 to prevent rotation of the reverse rail 23. At one end shifter head 77 has an end portion 83 with a slot 84 for receiving the end of the shift finger 61. As shown in FIG. 1, reverse rail 23 has fastened at the rear end, a perpendicular extending boss 85 which extends between the bifurcated end portion 86 of a reverse lever 87. This lever is pivotally mounted on cover 5 by an inwardly projecting pivot pin 89 integral with the cover 5. The lever has a depending arm portion 90 which extends at right angles to the major portion of the lever for engagement with the collar 91 of reverse gearing.

The rear support 11 has a passage 93 formed therein in which camming balls 95 are movably mounted. These balls are adapted to engage notches 97 formed in each of the rails to prevent movement of any two rails at the same time. Thus, if the notches are aligned in their neutral position, as in FIG. 1, movement of one rail, for example rail 19, will cause one of the balls 95 to engage in the notch in rail 21 to retain this rail in position as the rail 19 is moved to an adjusted position. As this ball 95 enters the notch in rail 21 it displaces a pin 98 located in a small bore 99 in rail 21, which pin is displaced toward rail 23. This pin then moves the balls 95 between rail 21 and 23 and forces the end ball into the notch in rail 23 to prevent movement of that rail. If all rails are in neutral position similar ball action will occur on movement of the reverse rail 23 when moved from the neutral position. Also, if all rails are in neutral movement of rail 21 from its position will simultaneously force the balls into locking engagement with the end rails 19 and 23.

The shift control rod 49 is mounted in the case 1 for both longitudinal and rotary movement. The finger 61 has a collar portion 100 secured to rod 49 by bolt 101 and is moved in accordance with movement of the rod. It will be appreciated that the finger 61 may be positioned in the slot of any selected shifter head for movement thereof and its attached shifter rail. The finger 61 also includes a perpendicular extension 103 which is engaged by the plunger 105 of a spring-biased detent 107. This plunger is formed with a circular groove 108 which receives ball detent 109. This latter detent forms an inhibitor which works against extension 103 to prevent rotation of finger 61 into engagement with the recess in the elongated shifter head 77. When the rod 49 is rotated to position the shift finger within the slot 84 of the reverse shifter head, this inhibitor will resist this motion. However, upon application of sufficient rotary force to the control rod, the action of the inhibitor detents will be overcome and the shift finger can be appropriately placed in the slot 84 and the rail 23 can be actuated to condition the transmission for reverse drive. After the reverse operation is completed the rail 23 is moved to its neutral position by the control rod 49. As the control rod is rotated to condition the transmission for a particular forward drive, the spring will bias the plunger 105 outwardly and the ball of the spring-biased detent 109 will reenter the groove on the plunger. This inhibitor will inhibit rotation of the shift rod into the reverse position.

Means are provided to limit the rotational and axial movement of the shift control rod 49. As shown in FIGURES 1 and 4, the shifter head 65 is formed with planar end surfaces 111 and 113 on opposite sides thereof. Axial movement of head 65 is limited in one direction when surface 111 contacts the outer surface 115 of the support 9 and in the other direction when surface 113 contacts the outer surface 117 of support 11. In a similar manner axial movement of shifter head 51 is limited by contact of corresponding planar end surfaces of this shifter head with surfaces 115 and 117 of the supports. Movement of the reverse shifter head to the right, viewing FIGURE 1, is limited by contact of planar surface 123 with the surface 117.

Rotational movement of the rod 49 is limited by a lateral extension 125 provided near the end of finger 61. This extension, upon rotation of rod 49, can contact the underside 127 of the end portion 70 of shifter head 65 or the top side 129 of end portion 83 of shifter head 77. Furthermore, when shifter head 51 is shifted from neutral, rotation of finger 61 will be limited since it will be contained within the limits established by the end portions of the shifter heads.

The controls of this invention may be assembled in an efficient sub-assembly operation as follows: the detents, such as 29, 31, are installed in the supports 9 and 11. The rails are then installed one at a time, each being inserted through aligned apertures in the supports and through the shifter head. Camming balls are installed in the passage 93 between the rails. The first pair of camming balls is installed after the insertion of the first rail in the supports, and the second pair after the insertion of the second rail. The reverse lever 87 which is pivotally mounted to the cover is connected to the pivot boss 85 and the pivoted forks are installed on the shifter heads 65 and 51. As indicated above, these forks are retained on their shifter heads due to the close fit of their pivots in the heads. The heads are aligned in a neutral condition with slots 60, 72 and 84 aligned. In this condition the cover-mounted controls are ready for assembly with the transmission. As will be seen from the drawings, the opening 3 has ample dimensions to permit the cover-mounted controls to be easily inserted into the case 1 without obstruction by the case. Assembly of the controls with the transmission is accomplished by installing the cover on the transmission case, with the forks and reverse arm portion 90 of the control engaging appropriate grooves in the transmission gearing and with the shift finger located in the recess formed by the aligned slots. Bolts 7 are then installed to securely connect the cover with the case. It will be appreciated that applicant has provided a continuous cover for a transmission which has no openings other than those for the fastener bolts 7. This prevents entry of foreign matter into the transmission through the cover.

With the present invention, disassembly of the cover-mounted controls from the transmission is facilitated since their profile fits within access opening 3 and therefore can be easily removed as a unit by removal of the cover. This is accomplished without obstruction by case 1 and without removal of the control rod. This provides for efficient inspection and repair, if necessary, since the cover and controls may be moved to the convenient work area.

In low range operation, the shift finger 61 is rotated by rotation of rod 49 into slot 60 of the shifter head 51. Longitudinal movement of the rod 49 in a predetermined direction, for example to the right in viewing FIG. 1, will move the rail 19 and the shifter head to the right. The shift fork carried by the head then conditions the transmission for its low range operation. Locking ball 95 is moved out of the notch in rail 19 and the adjacent locking ball is moved into the corresponding notches in rails 21 and 23 to lock these rails in neutral position. Simultaneously, detent 29 is displaced from neutral notch 39 and enters notch 41 to hold the rail 19 in its adjusted position. Due to the pivot connection between the fork and its support, the fork is self-aligning. This prevents binding and uneven fork wear upon actuation of the shifter rail.

In gear change from first to second drive the control rod 49 is longitudinally moved to the left until detent 31 engages notch 37. At this time locking balls 95 engage the notches 97 in rails 21 and 23. In this position the first-second fork 63 has been displaced to the left to move the synchronizer mechanism to the left conditioning the transmission for an intermediate range operation.

Third drive range is selected by returning the shifter rail 19 back to its neutral position and rotating the control rod 49 and shift finger 61 to engage the bifurcated end portion 70 of shifter head 65. In a manner similar to that described in connection with the low and intermediate range operation, the transmission may be conditioned by appropriate longitudinal movement of the rail 21 and its fork assembly.

Reverse is accomplished in a similar fashion by positioning the finger within the recess of the reverse shifter head 77 and moving the rod from its neutral position to a reverse position in which the reverse lever is pivoted upon pin 89. This motion is transferred to the depending arm portion 90 of this lever and to the collar of the reverse idler gear for conditioning the transmission for reverse drives. Disengagement of the reverse idler gear is accomplished by returning the shifter rail 23 to its neutral position from which another gear ratio may be selected.

From the above, it will be now understood that applicant has provided new and improved controls for a multi-speed transmission which are mounted on the cover of a transmission housing and in which the sub-assembly of the controls to the cover is facilitated and which further permits the efficient assembly of the controls with the transmission.

Although a preferred embodiment of this invention has been shown and described, other variations and modifications may be made. The invention is, therefore, not to be limited by this description but only by the following claims.

We claim:

1. In a control for a multi-speed transmission comprising a case for housing the transmission, said case being formed with an access opening therein, a cover member for said opening, a plurality of elongated members movably mounted on the inside of said cover member, a shifter head secured to each of said elongated members, movable means on at least one of said heads for changing transmission output on movement thereof, shift control means spaced from said cover member and movably mounted on said case for shifting said heads to predetermined positions, means removably securing said cover member to said case, and said heads and elongated members in one of said predetermined positions fitting within the area of said access opening to facilitate assembly and removal of said cover member and controls as a unit with said case.

2. In a control for a multiratio transmission, a housing for said transmission having an access opening therein, a cover for said access opening, means for securing said cover to said housing, support means mounted on said cover, said support means being located within the confines of said housing when said cover is secured to said housing, a plurality of shifter rails mounted for longitudinal movement in said supports, a shifter head rigidly secured to each of said rails, each said shifter head having an end portion which extends toward one side of said housing, said end portions being substantially aligned when said shifter rails are in a predetermined adjusted position, a shifter fork pivotally mounted on at least one of said shifter heads for operatively connecting at least one of said rails to change-speed gearing of said transmission, a lever member pivoted to said cover, means on another of said rails for pivoting said lever member, said lever member having an arm portion operatively connected to other gearing of said transmission, a shift control member spaced from said cover and mounted for longitudinal and rotary movement in one side of said housing, said shift control member having a laterally extending finger portion for engagement with any of said end portions of said shifter heads, said transmission being conditioned for different drives by adjustment of selected rails by appropriate movement of said shift control member.

3. In a control for a multiratio transmission, a housing for said transmission having an access opening therein, a cover for said access opening, means for securing said cover to said housing, spaced supports mounted on said cover, said supports being within the confines of said housing when said cover is secured to said housing, first, second and third shifter rails mounted for longitudinal reciprocal movement in said supports, a shifter head rigidly secured to each of said rails, each said shifter head having an end portion which extends toward one side of said housing, said end portions having recesses therein which are substantially aligned when said shifter rails are in a predetermined adjusted position, a shifter fork pivotally mounted on at least two of said shifter heads for operatively connecting two of said rails to change-speed gearing in said transmission, a lever member pivoted to said cover, means on one of said rails for pivoting said lever member, said lever member having an arm portion operatively connected to other gearing in said transmission, a shift control rod mounted for longitudinal and rotary movement in one side of said housing, said rod being substantially parallel with said rails, said control rod having a finger portion for selective engagement within any selected recess in said end portions of said shifter heads, said transmission being conditioned for different drives by adjustment of selected rails by appropriate movement of said rod.

4. In controls for a multiratio transmission, a housing for said transmission having an access opening therein, a cover for said access opening, means for securing said cover to said housing, spaced supports mounted on the inside of said cover, said supports being within the confines of said housing when said cover is secured to said housing, first, second and third elongated members mounted for longitudinal movement in said supports, a shifter head rigidly secured to each of said members, each said shifter head having an end portion which extends toward one side of said housing, said end portions having slots therein which are substantially aligned when said elongated members are in a predetermined adjusted position, a shifter fork pivotally mounted on two of said shifter heads for operatively connecting two of said elongated members to the gearing of said transmission, a lever member pivoted to said cover, means on one of said elongated members for pivoting said lever member with respect to said cover, said lever member having an arm portion operatively connected to other gearing in said transmission, a shift control member mounted for movement in one side of said housing, said control member having a means for selective engagement within any selected slot in said end portions of said shifter heads, said transmission being conditioned for different drives by adjustment of selected shifter heads by appropriate movement of said shift control member, and said elongated members and said shifter heads and said lever member having a profile which is accommodated by said access opening to permit assembly and removal of said cover member and controls as a unit with said housing.

5. In a control for a multi-speed transmission comprising a case for housing the transmission, said case being formed with an access opening therein, a cover member for said opening, a plurality of elongated members movably mounted on the inside of said cover member, a shifter head secured to each of said elongated members, movable means on at least one of said heads for changing transmission output on movement thereof, rotatable and longitudinally movable shift control means mounted in said case for shifting said heads to predetermined positions, means removably securing said cover member to said case, said heads and elongated members in one of said predetermined positions fitting within the area of said access opening to permit assembly and removal of said cover member and controls as a unit with said case, means secured to said cover member for contacting said heads to limit axial movement of said heads and said elongated members, means on said heads for limiting rotational movement of said shift control means.

6. In a control for a multi-speed transmission comprising a case for housing the transmission, said case being formed with an access opening therein, a continuous cover for completely closing said opening, spaced support members mounted on the inside of said cover, elongated longitudinally movable members extending between said support members, a shifter head member attached to each of said longitudinal members, each of said shifter head members having an end portion with a slot therein, said slots being aligned when said movable members are in a predetermined position, means secured to at least one of said shifter head members operatively connected to certain gearing of the transmission, rotatable and longitudinally movable shift control means movably mounted in said case for selectively shifting said shifter head member, said shift control means having an extension adapted to be seated in said slots, means on said extension for contacting said head members to limit rotation of said shift control means, said spaced support members providing means for limiting axial movement of said shifter head members, means removably securing said cover to said case, said cover supported members having a profile fitting within the area of said opening to permit assembly and removal of said cover and said cover-supported members as a unit with said case and the transmission.

References Cited

UNITED STATES PATENTS

| | | | |
|---|---|---|---|
| 2,029,178 | 1/1936 | Manville | 74—473 |
| 2,368,868 | 2/1945 | Orr | 74—477 |
| 2,438,691 | 3/1948 | Armantrout | 74—477 |
| 2,320,454 | 6/1943 | Eberhard | 74—477 |

MILTON KAUFMAN, *Primary Examiner.*